UNITED STATES PATENT OFFICE.

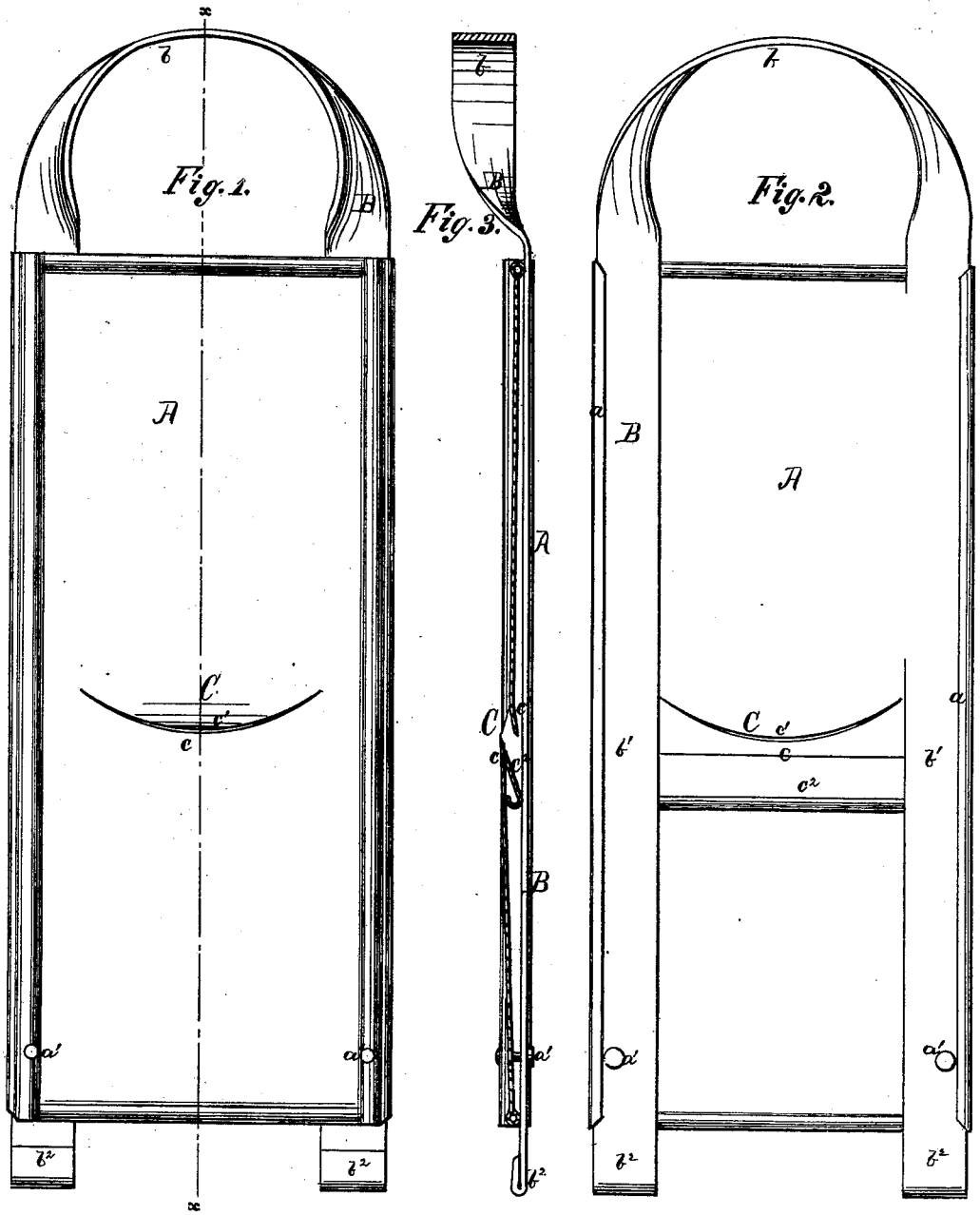

JOSEPH KUCHINKA, OF CLEVELAND, OHIO.

IMPROVEMENT IN VEGETABLE-SLICERS.

Specification forming part of Letters Patent No. 190,875, dated May 15, 1877; application filed December 29, 1876.

*To all whom it may concern:*

Be it known that I, JOSEPH KUCHINKA, of Cleveland, Cuyahoga county, in the State of Ohio, have invented an Improvement in Vegetable and Fruit Slicers, of which the following is a full, clear, and exact description, reference being had to the accompanying drawings, forming part of this specification.

My invention relates to a tool or device for cutting vegetables or fruit into slices; and it consists in the parts and combination of parts hereinafter particularly set forth and described.

Figure 1 is a plan or top view of a slicer embodying my invention. Fig. 2 is an under side or reverse view of the same; and Fig. 3 is a longitudinal sectional view on the line $x\ x$, Fig. 1.

A is a sheet of metal, preferably iron, coated with tin. This sheet forms the table of the cutter, and is preferably given the form shown in the drawing—that is, rectangular, and of a length about three times its width.

B is the frame which supports the said table. This frame is composed of the longitudinal arms $b^1$, to which the table is secured by the turned or bent edge thereof $a$ and the rivets $a'$, and the said arms are united at their upper end by the handle $b$, while at their lower or opposite ends they extend beyond the table and form legs $b^2$, upon which the device is rested when in use.

C is the cutting or slicing device, which is formed by making a curved slit in the table A, and drawing the upper or concave edge $c$ of the slit upward above the plane of the table, and depressing the lip or lower convex edge $c^1$ of the slit below the plane of said table. The edge $c$ constitutes the cutting-edge, and the lip $c^1$, by being raised or depressed, acts as a gage to regulate the thickness of the slices to be cut by the tool. Extending transversely across the table on its under side, and immediately in the rear of the cutting-edge $c$, is fixed the inclined plate $c^2$, which forms a continuous downward incline with said cutting-edge. This plate acts to strengthen and keep rigid the cutting-edge, and at the same time to guide the slices cut downward into a suitable receptacle. The cutting-edge is sharpened on its under side. The cutting-edge being curved, it will not wear away in any one place, but will wear equally on its edge.

In operation the tool is grasped by the handle $b$, with the knife $c$ on the upper side, the lower end of the frame resting upon some convenient object. The vegetable or fruit is then passed rapidly over the table against the knife $c$, when it will be cut into slices, which will drop into a suitable receptacle, through the opening between the knife $c$ and lip $c^1$.

What I claim as my invention, and desire to secure by Letters Patent, is—

A vegetable and fruit slicing device, having the table A mounted on frame B, composed of arms $b^1$ and handle $b$, and provided with the cutter C, composed of knife-edge $c$, depressed lip $c^1$, and transverse inclined plate $c^2$, as described.

JOSEPH KUCHINKA.

Witnesses:
GEO. MENGER,
F. H. BIERMANN.